United States Patent Office 3,838,177
Patented Sept. 24, 1974

3,838,177
SUBSTITUTED 9,10-DIHYDROANTHRACENES
Arthur D. Sill, Cincinnati, Ohio, assignor to Richardson-Merrell Inc., New York, N.Y.
No Drawing. Filed Dec. 21, 1972, Ser. No. 317,129
Int. Cl. C07c 93/06
U.S. Cl. 260—351                                        4 Claims

ABSTRACT OF THE DISCLOSURE

Novel 9,10-alkylidene-2,6 and 2,7-bis basic ethers of 9,10-dihydroanthracene, their preparation and use for the prevention and inhibition of viral infections are disclosed.

FIELD OF THE INVENTION

This invention relates to new organic chemical compounds, to methods of preparing such compounds and to pharmaceutical compositions which contain these compounds as the active ingredient. The compounds described herein are antiviral agents which are useful in inactivating or inhibiting viruses by their administration to either an infected or a non-infected host.

BACKGROUND OF THE INVENTION

There is a growing body of information that viruses play a vital role in a broad range of diseases, some of which represent the most serious of man's ills. Arthritis, juvenile arthritis, diabetes, Hodgkin's disease and various immunological diseases and degenerative diseases of the central nervous system have been linked to viruses as the causative agents.

At present, the control of virus infections is primarily achieved by means of immunization vaccines. For example, poliomyelitis, smallpox, measles and influenza are well recognized diseases in which virus vaccines have proven effective. In general, however, virus vaccines have had only a moderate success in animal prophylaxis. Each vaccine acts primarily against a specific virus and is not heterophilic in the protection it offers. Hence, vaccines have not provided a practical solution against the wide array of infectious viruses, even where limited, as for example, to respiratory viruses alone.

One approach to the control of virus-related diseases and, particularly to the spread of such virus diseases, has been to search for medicinal agents or chemotherapeutic agents which are capable of inhibiting the growth of viruses, thereby preventing the spread of disease as well as preventing further spread and damage to cells and tissues of the animal host which have not as yet been infected. Heretofore, only a limited number of virus infections such as smallpox, Asian influenza and herpes keratitis have been prevented by chemical antiviral agents. Sulfonamides and antibiotics which have revolutionized the treatment of bacterial infections have substantially no effect upon virus infections. Certain infections caused by large viruses, such as lymphogranuloma venereum, psittacosis and trachoma have been successfully treated using antibiotics and sulfa drugs. However, the majority of infections have not been responsive to attack by chemotherapeutic agents. Thus, it can be seen that there is a need for new chemotherapeutic agents which are effective against a broad range of virus diseases, and which at the same time, are non-toxic to the host.

As a result of a long series of investigations, applicant has discovered a novel class of alkylidene derivatives of 9,10-dihydroanthracenes which are particularly useful antiviral agents. These compounds are effective against a wide spectrum of virus infections and are useful in treating such infections both prophylactically and therapeutically. Copending application, Ser. No. 37,312, filed May 14, 1970, whose counterpart has been published as Belgium Pat. 767,201, represents the closest art known to applicant and discloses bis basic ethers of 2,6 and 2,7-dihydroxyanthraquinone having antiviral activity. The compounds of the present invention differ from those of the prior art in that they are not ketonic in nature, i.e., derivatives of anthraquinone, but rather represent new dialkylidene derivatives of 9,10-dihydroanthracene. Furthermore, some of the dihydroanthraquinone compounds described in the prior art serve as starting materials for the preparation of the compounds of the present invention. To applicant's knowledge, the dialkylidene derivatives of 9,10-dihydroanthracene are novel compounds which have not previously been described nor reported in the literature. Furthermore, applicant is unaware of any 9,10-dihydroanthracene derivatives whatsoever which have been previously reported to posses antiviral activity. The instant compounds demonsrtate a wide spectrum of antiviral activity in varying degrees which could not have been predicted from a knowledge of the present state of the art.

SUMMARY OF THE INVENTION

This invention relates to new dialkylidene derivatives of 9,10-dihydroanthracenes, to their preparation and to their use as pharmaceutical agents. More particularly, the compounds of the present invention are 9,10-dialkylidene, derivatives of bis-basic ethers of 9,10-dihydroanthracene, which are useful as antiviral agents. Still more particularly, the compounds of the present invention are represented by the following general formula:

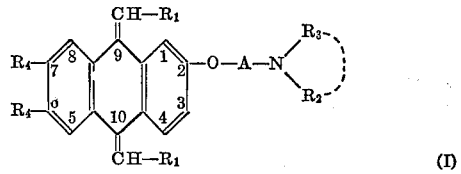

(I)

wherein $R_1$ is selected from the group consisting of hydrogen and a lower alkyl group having from 1 to 6 carbon atoms; A is ethylene or propylene; $R_2$ and $R_3$ are each lower alkyl having from 1 to 3 carbon atoms and which when taken together with the nitrogen atom to which they are attached represent the pyrrolidinyl, piperidino or morpholino radical; and $R_4$ is selected from the group consisting of hydrogen and the radical

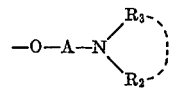

with the proviso that one and only one such $R_4$ group is hydrogen. The compounds contemplated to be within the scope of this invention include the free base representations, as shown in formula (I), as well as the pharmaceutically acceptable acid addition salts thereof.

The 9,10-dialkylidene derivatives of 2,6 and 2,7-bis basic ethers of 9,10-dihydroanthracene are prepared by reacting the corresponding 2,6 and 2,7-bis basic ethers of anthraquinone with an organometallic reagent such as a Grignard reagent or an organolithium reagent.

To achieve an antiviral effect the compounds of this invention are administered to a suitable host using a variety of compositions. Such compositions may be administered either prior to infection, as with a prophylactic use or treatment, or they may be therapeutically administered subsequent to infection, as with a curative use or treatment. The compounds of this invention may also be applied externally or topically directly at the situs of infection, or they may be administered internally or systemically, irrespective of whether the treatment is prophylactic or curative in nature. In either event, replication of the virus is inhibited or prevented with the concomitant result that the various disease symptoms characteristic of the pathogenic virus infection are no longer present.

DETAILED DESCRIPTION OF THE INVENTION

As can be seen from general formula (I) above, the compounds of the present invention are essentially 9,10-dialkylidene derivatives of 9,10-dihydroanthracene. The alkylidene substituents, represented by the symbol $R_1$, can be methylidene, as for example, where $R_1$ is hydrogen, or they may represent higher homologues thereof. The term lower alkyl as used with respect to the alkylidene portion of the molecule relates to groups having from 1 to 6 carbon atoms. Illustrative of such groups can be mentioned both straight or branched chain alkyl radicals such as: methyl, ethyl, n-propyl, isopropyl, n-butyl, sec-butyl, isoamyl, n-pentyl and n-hexyl.

It can be further seen from general formula (I) above, that there are two basic side chains, each of which is separately located on a benzenoid portion of the 9,10-dihydroanthracene nucleus. Each side chain can be viewed as consisting essentially of a basic amino function located at the terminal end of the side chain, an ether function located at the proximal end of the side chain which serves as a bridging function tieing the basic side chain to the aromatic nucleus, and an alkylene chain of either 2 or 3 carbon atoms which separates the bridging function from the terminal basic amino function.

The basic amino function, represented by the symbol

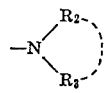

can be a primary, secondary or tertiary amino group. Preferably, each amino group is a tertiary amine. The symbols $R_2$ and $R_3$ represent either a lower alkyl group or when joined with the nitrogen atom to which they are attached represent various saturated monocyclic, heterocyclic radicals. Typical of such heterocyclic radicals are the 1-pyrrolidinyl, piperidino or morpholino radicals. Compounds containing these groups are readily prepared and typify saturated monocyclic, heterocyclic radicals which are generally useful in lieu of the dilower alkylamino groups present in the compounds of this invention. The term lower alkyl as used with respect to the basic amino function relates to groups having from 1 to 3 carbon atoms. Illustrative of such groups are methyl, ethyl, n-propyl and isopropyl.

As can be seen from general formula (I) above, and its description, the compounds of the present invention include structures in which the symbol $R_4$ in the 7-position is a hydrogen atom, whereas the same symbol in the 6-position represents the radical

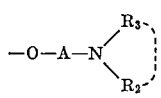

Such structures are more fully illustrated in the following general formula wherein the symbols A, $R_1$, $R_2$ and $R_3$ have the values previously assigned.

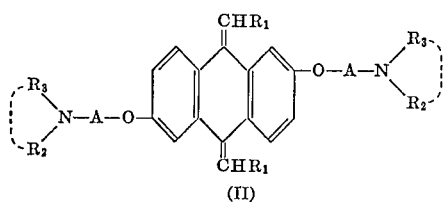

Similarly, the compounds of the present invention also include structures in which the symbol $R_4$ in the 6-position is a hydrogen atom, whereas the same symbol in the 7-position represents the radical

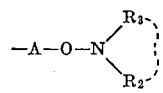

Such structures are more fully illustrated in the following general formula wherein the symbols A, $R_1$, $R_2$ and $R_3$ again have the values previously assigned.

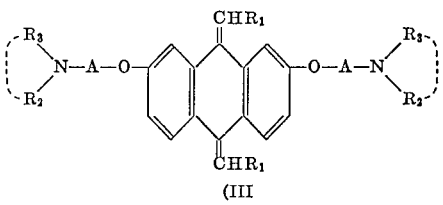

Illustrative of the base compounds which are represented by the above general formula (I) there can be specifically mentioned:

2,6-bis[2-(dimethylamino)ethoxy]-9,10-diethylidene-9,10-dihydroanthracene,
2,6-bis[2-(dimethylamino)ethoxy]-9,10-dihydro-9,10-dipropylideneanthracene,
2,6-bis[2-(diethylamino)ethoxy]-9,10-dibutylidene-9,10-dihydroanthracene,
2,6-bis(2-piperidinoethoxy)-9,10-dibutylidene-9,10-dihydroanthracene,
2,6-bis[3-(diisopropylamino)propoxy]-9,10-dihydro-9,10-dimethyleneanthracene,
2,6-bis(3-morpholinopropoxy)-9,10-dibutylidene-9,10-dihydroanthracene,
2,7-bis[2-(diethylamino)ethoxy]-9,10-dibutylidene-9,10-dihydroanthracene,
2,7-bis(3-pyrrolidinylpropoxy)-9,10-dihydro-9,10-dipentylideneanthracene,
2,7-bis[2-(dimethylamino)ethoxy]-9,10-dihydro-9,10-dihydroanthracene,
2,7-bis(2-piperidinoethoxy)9,10-dibutylidene-9,10-dihydroanthracene and
2,7-bis[3-(dimethylamino)propoxy]-9,10-diethylidene-9,10-dihydroanthracene.

The expression "pharmaceutically acceptable acid addition salts" is intended to apply to any non-toxic organic or inorganic acid addition salts of the base compound represented by formula (I). Illustrative inorganic acids which form suitable salts include hydrochloric, hydrobromic, sulfuric and phosphoric acids and acid metal salts such as sodium monohydrogen orthophosphate and potassium hydrogen sulfate. Illustrative organic acids which form suitable salts include the mono, di and tricarboxylic acids. Illustrative of such acids are, for example, acetic, propionic, glycolic, lactic, pyruvic, malonic, succinic, glutaric, fumaric, malic, tartaric, citric, ascorbic, maleic, hydroxymaleic, benzoic, p-hydroxybenzoic, phenylacetic, cinnamic, salicyclic, 2-phenoxybenzoic and sulfonic acids such as methane sulfonic acid and 2-hydroxyethane sulfonic acid. Either the mono or the di-acid salts can be formed, and such salts can exist in either a hydrated or a substantially anhydrous form. In general, the acid addition salts of these compounds are crystalline materials which are soluble in water and various hydrophilic organic solvents and which in comparison to their free base forms, generally demonstrate higher melting points and an increased chemical stability.

The compounds of the present invention can be prepared by reacting a Grignard reagent or an organolithium reagent with a 2,6 or a 2,7-bis basic ether of anthraquinone having the general formula:

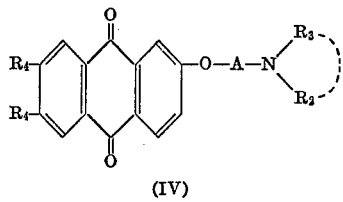

(IV)

wherein A is ethylene or propylene; $R_2$ and $R_3$ are each lower alkyl having from 1 to 3 carbon atoms and which when taken together with the nitrogen atom to which they are attached represent the pyrrolidinyl, piperidino or morpholino radical; and $R_4$ is selected from the group consisting of hydrogen and the radical

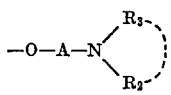

with the proviso that one and only one such $R_4$ group can be hydrogen.

The 2,6 or 2,7-bis basic ethers of anthraquinone (IV), which are useful as starting materials for the preparation of the compounds of the present invention can be prepared in a variety of ways starting from readily available materials such as anthraflavic and isoanthraflavic acids. Isoanthraflavic acid or 2,7-dihydroxyanthraquinone can be prepared by the method described by J. Hall and A. G. Perkin, J. Chem. Soc. (London), 123, 2036 (1923). Anthraflavic acid or 2,6-dihydroxyanthraquinone is a common dyestuff intermediate which is commercially available. Treatment of these 2,6 or 2,7-dihydroxyanthraquinones (V) with a haloalkylamine (VI), such as N,N-diethyl-2-chloroethylamine, in the presence of a base results in the preparation of the corresponding 2,6- or 2,7-bis basic ethers. Alternatively, the 2,6 or 2,7-dihydroxyanthraquinones can be treated with a dihaloalkene, such as 1-bromo-2-chloroethane, to form the intermediate 2,6 or 2,7-bis(ω-haloalkoxy) anthraquinones (VII), which can then be further condensed with an alkylamine (VIII) to give the desired 2,6 or 2,7-bis basic ethers of anthraquinone (IV). These reaction schemes may be illustrated as follows:

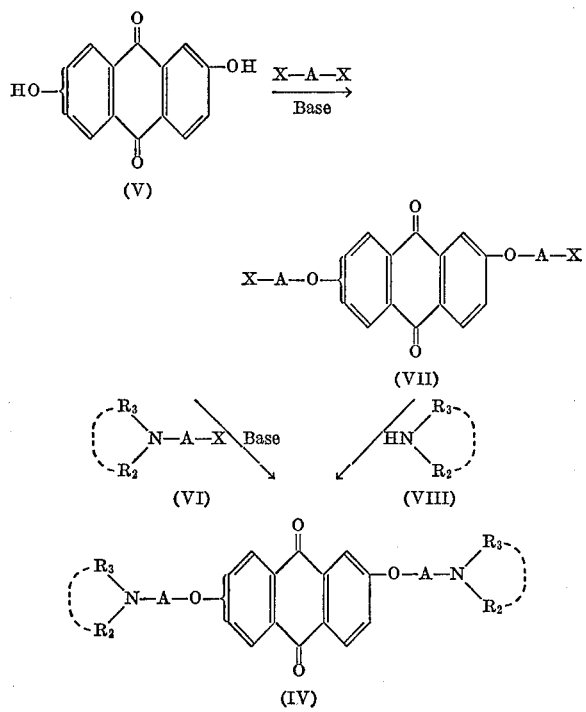

In these reactions the substituents A, $R_2$ and $R_3$ have the same values as previously assigned and the symbol X represents a reactive halogen, such as chlorine, bromine or iodine. The substitution exemplified in braces is intended to indicate an alternative substitution in either the 6 or the 7-positions of the A-ring. Specific illustrations for the preparation of these 2,6 or 2,7-bis basic ethers of anthraquinone are found disclosed in copending application Ser. No. 37,312, filed May 14, 1970, whose counterpart has been published as Belgium Pat. 767,201.

The reaction of the 2,6 and 2,7-bis basic ethers of anthraquinone with an organometallic reagent to prepare the compounds of the present invention is generally conducted in two stages. The first stage involves the preparation of the organometallic reagent, which is then permitted to react during the second stage with an anthraquinone bis basic ether. Following this interconversion reaction, excess organometallic reagent is decomposed, the quinone intermediate which forms is dehydrated, and the resulting 2,6 or 2,7-bis basic ether of 9,10-dialkylidene-9,10-dihydroanthracene is isolated from the reaction mixture using standard techniques known to the art.

Dehydration of the quinol intermediate can occur spontaneously during the workup of the reaction, or can be promoted by the addition of a dehydrating agent, if necessary, with the application of external heat. This reaction scheme is illustrated in the following sequence:

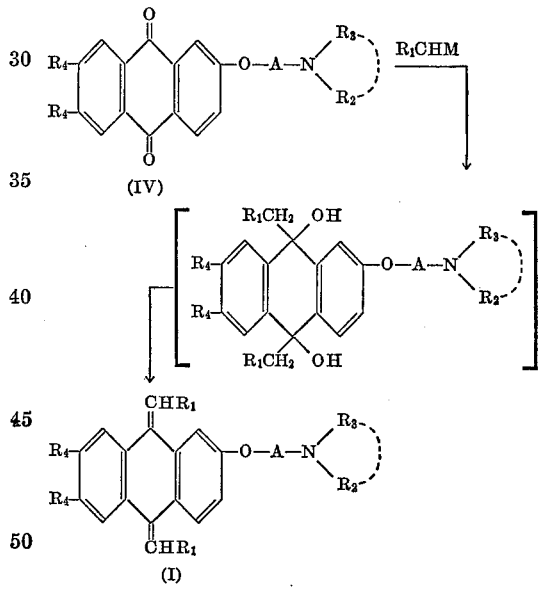

In this reaction the symbol M represents either magnesium halide, one half mole of magnesium or lithium, and the symbols A, $R_1$, $R_2$, $R_3$ and $R_4$ have the same values previously assigned.

Preparation of the Grignard or organolithium reagents takes place via any of several well-known methods which have been described in the chemical literature, the usual precautions having been taken to exclude moisture. Thus, for example, a lower alkyl halide, dissolved in a suitable inert organic solvent, is added to a stirred suspension of finely cut lithium wire contained in either the same or in a different inert organic solvent, the addition taking place in an inert, dry atmosphere. A solution or a finely divided suspension of the 2,6 or 2,7-bis basic anthraquinone ether is added to the organometallic reagent so prepared, using either the same or a different solvent combination. By the term "suitable inert organic solvent" is meant a solvent in which the starting materials are reasonably soluble and in which they are either nonreactive or only slowly reactive with the organometallic reagent being used. Thus, the reaction can be conducted in solvents such as anhydrous ether, tetrahydrofuran, dioxane, hexamethylphosphoramide or mixtures thereof. This latter solvent has been found to be a particularly useful solvent for the dehydration of the quinol intermediate which is formed.

The organometallic reaction can be conducted over a wide temperature range of from about −50° to about 80° C. The temperature used is determined essentially by the stability of the organometallic reagent in the particular solvent system employed. For example, the organolithium reagents have a tendency to cleave ether linkages. Hence, when n-butyllithium is prepared in solvents such as tetrahydrofuran or dioxane, temperatures near −35° C. are usually employed to avoid interaction with the solvent. Generally, the organometallic reagents are first reacted with the anthraquinone ethers at a reduced temperature ranging from about −50° to about 0° C., and subsequently heated for a period of 1 to 48 hours at temperatures ranging from about 30° to about 80° C. in order to promote the completion of the reaction. In the case of the more reactive organolithium reagents, no additional heating is required, i.e., the reaction mixtures are allowed to warm to room temperature and permitted to remain at room temperature for a period of from about 1 to 24 hours. In general, methyllithium undergoes a slow interconversion with the bis basic anthraquinone ethers. Phenyllithium reacts more rapidly but is more stable than methyllithium. However, the reagent of choice is n-butyllithium, which possesses good stability and which can be prepared in a higher yield than either ethyllithium or n-propyllithium. Generally, the quinol intermediate and excess organometallic reagent are decomposed via the portionwise addition of cracked ice to the reaction mixture. The organic layer is separated and the desired 9,10-dialkylidene-2,6 or 2,7-dihydroanthracene-bis basic ethers are isolated therefrom using methods commonly employed by those skilled in the chemical arts.

The compounds of the present invention are antiviral agents. Preferably they are administered to an animal host to prevent or inhibit viral infections. The term host refers to any viable biological material or intact animal including humans which is capable of inducing the formation of interferon and which serves as a support means for virus replications. The host can be of animal or mammalian origin. Illustratively such hosts include birds, mice, rats, guinea pigs, gerbils, ferrets, dogs, cats, cows, horses and humans. Other viable biological material such as used in the production of vaccines may also act as a host. Thus, tissue cultures prepared from organ tissues, such as mammalian kidney or lung tissue, as well as tissue cultures prepared from embryo tissue, such as obtained from amniotic cells or chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present invention are infections caused by picornaviruses, such as encephalomyocarditis virus; myxoviruses, such as influenza $A_2$ (Jap/305) virus; arboviruses, such as Semliki forest virus; the herpes group of viruses, including herpes simplex; and the poxviruses, as for example vaccinia IHD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ anywhere from 5 to 50, delay or prevent completely the onset of death. Salts of these compounds are generally administered in compositions containing a 0.15% aqueous hydroxyethylcellulose vehicle, whereas the free base compounds are generally administered in compositions containing a 10% aqueous surfactant vehicle in order to help solubilize the compound. In general, ten mice are used for each treated group with an additional 20 mice serving as a control group. At the time of administration the test virus is titrated in order to determine the potency of $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated by a side by side comparison of the survival time of treated animals with the untreated control group of animals.

Respiratory viruses, such as influenza $A_2$ (Jap/305) virus, which are also lethal to the test animals employed, are administered via intranasal instillation. Animals infected in this manner have the active igredients administered in the same manner as the test virus, and against a side by side comparison is made of the survivors of the animals treated with the untreated control animals.

Inexplicably, a mouse treated with a normally fatal infection of encephalomyocarditis or influenza virus occasionally survives without further treatment. This may be the result of a prior, interferon-induced infection in the mouse, or perhaps due to some genetic factor or other natural defense mechanism not presently understood. For this reason the control group selected is of sufficient size as to statistically reduce to a negligible amount the influence of such a chance survivor upon the test results.

The vaccinia test virus is typical of the dermatotropic type viruses which respond to treatment with compositions containing the compounds of the instant invention. The vaccinia virus generally produces a non-fatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals which serve as a control group. The compounds of the present invention have been found to be effective in varying degrees against one or all of these test virus systems.

The mode of activity of the active ingredients of the present invention is not rigorously defined. *Inter alia,* the compounds of the present invention may induce the formation of interferon in a viable host. Interferon is a biological substance of unknown chemical structure, presumably proteinaceous in nature, which is produced by host cells in response to a viral infection. The interferon so produced acts to induce a virus inhibiting substance, which inhibits in some yet unknown manner the intracellular replication of the virus without appearing to have any inactivation effect per se upon the virus itself. A few of the viruses susceptible to interferon replication inhibition are described in Horsfall and Tamm, "Viral and Rickettsial Infections of Man" 4th Edition (1965), J. B. Lippincott Company, pp. 328–9.

As previously indicated, the compounds of the present invention may be prophylactically administered in order to prevent the spread of contagious viral diseases or they may be therapeutically administered to a host already infected intended for their curative effect. When administered prophylatically, it is preferred that the administration be made within 0 to 96 hours prior to the infection of the host animal with a pathogenic virus. When the compounds of the present invention are administered for their curvative effect, it is preferred that they are administered within about 1 or 2 days following infection of the host in order to obtain the maximum therapeutic effect.

The dosage to be administered will be dependent upon such parameters as the particular virus for which either treatment or prophylaxis is desired, the species of animal involved, its age, health, weight, the extent of infection, concurrent treatment, if any, frequency of treatment and the nature of the effect desired. A daily dose of the active ingredients will generally range from about 0.1 mg. to about 500 mg. per kg. of body weight. Illustratively, dosage levels of the administered active ingredients for intravenous treatment range from about 0.1 mg. to about 10 mg. per kg. of body weight; for intraperitoneal administration range from about 0.1 mg. to about 50 mg. per kg. of body weight; for subcutaneous administration range from about 0.1 mg. to about 250 mg. per kg. of body weight; for oral administration may be from about 0.1 mg. to about 500 mg. per kg. of body weight; for intranasal instillation range from about 0.1 mg. to about 10 mg. per kg. of body weight; and for aerosol inhalation therapy, the range is generally from about 0.1 mg. to about 10 mg. per kg. of body weight.

The novel compounds described herein can also be administered in various different dosage unit forms, e.g., oral compositions such as tablets, capsules, dragees, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particuar dosage unit employed, the animal host being treated, and the nature of the treatment, i.e., whether prophylactic or therapeutic in nature. Thus, a particular dosage unit may contain from about 2.0 mg. to over 3.0 g. of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium stearate and petrolatum. Suitable liquid excipients include water and alcohols such as ethanol, benzyl alcohol and the polyethylene alcohols either with or without the addition of a surfactant. In general, the preferred liquid excipients particularly for injectable preparations, include water, saline solution, dextrose and glycol solutions such as an aqueous propylene glycol or an aqueous solution of polyethylene glycol. Liquid preparations to be used as sterile injectable solutions will ordinarily contain from about 0.5% to about 25% by weight, and preferably from about 1% to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A suitable method of administration for the compounds of the present invention is orally either in a solid dose form such as a tablet or capsule, or in a liquid dose form such as an elixir, suspension, emulsion or syrup. Ordinarily the active ingredient comprises from about 0.5% to about 10% by weight of an oral liquid composition. In such compositions, the pharmaceutical carrier is generally aqueous in nature, as for example, aromatic water, a sugar-based syrup or a pharmaceutical mucilage. For insoluble compounds suspending agents may be added as well as agents to control viscosity, as for example, magnesium aluminum silicate or carboxymethylcellulose. Buffers, preservatives, emulsifying agents and other excipients can also be added.

For parenteral administration such as intramuscular, intravenous or subcutaneous administration, the proportion of active ingredient ranges from about 0.05% to about 20% by weight, and preferably from about 0.1% to about 10% by weight of the liquid composition. In order to minimize or eliminate irritation at the site of injection, such compositions may contain a non-ionic surfactant having a hydrophile-lipophile balance (HLB) of from about 12 to about 17. The quantity of surfactant in such formulations ranges from about 5% to about 15% by weight. The surfactant can be a single component having the above identified HLB, or a mixture of two or more components having the desired HLB. Illustrative of surfactants useful in parenteral formulations are the class of polyoxyethylene sorbitan fatty acid esters as, for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05% to about 20% by weight of the total formulation, the remaining component or components comprising liquid pharmaceutical excipients previously mentioned.

The active ingredients of the present invention can also be admixed directly with animal feeds or incorporated into the drinking water of animals. For most purposes, an amount of active ingredient is used which provides from about 0.0001% to about 0.1% and preferably, from about 0.001% to about 0.02% by weight of the active ingredient based upon the total weight of feed intake. The active ingredients can be admixed in animal feed concentrates, suitable for use by farmers or livestock growers for incorporation in appropriate amounts with the final animal feeds. These concentrates ordinarily comprise from about 0.5% to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatibility with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples:

EXAMPLE I 2,6-Bis(2-diethylaminoethoxy) anthraquinone dihydrochloride

A solution of 12 g. (0.3 mole) of sodium hydroxide in 15 ml. of water is added, with efficient stirring, to a boiling mixture of 36 g. (0.15 mole) of 2,6 dihydroxyanthraquinone suspended in 250 ml. of xylene. The mixture is heated to reflux with continued stirring and the water is removed from the reaction mixture by collection in a Dean-Stark distilling receiver. When all of the water is removed, a solution of 2-diethylaminoethyl chloride in 250 ml. of xylene is added. This solution is prepared by dissolving 100 g. (0.58 mole) of 2-diethylaminoethyl chloride hydrochloride in 20 ml. of water, covering the solution with 200 ml. of xylene, chilling the mixture to about $-5°$ C., and with rapid stirring, adding a solution of 45 g. of potassium hydroxide in 35 ml. of water. The xylene layer is decanted from a thick slurry of inorganic salts and water, which are washed with another 50 ml. of xylene. The combined xylene extracts are dried using anhydrous magnesium sulfate and filtered. The filtrate, 250 ml., is added to the mixture of 2,6-dihydroxyanthraquinone and the resulting mixture is heated at reflux temperature with rapid stirring for a period of 28 hours. The mixture is poured into 500 ml. of water and the yellow solid which separates at the xylene/water interface removed by vacuum filtration. This material, which represents the major portion of the desired free base is washed thoroughly with hot water and dried, m.p. 177–80° C. Another 5 to 10 percent of the free base is isolated from the xylene layer. The free base is dissolved in chloroform, the resulting solution acidified to Congo red with ethereal hydrogen chloride, diluted with ether, and the yellow precipitate which forms is vacuum filtered. The dihydrochloride salt of 2,6-bis(2-diethylaminoethoxy)anthraquinone so obtained is suspended in boiling methanol (20–25 ml. per gram) and a very small volume of water added to effect solution. The solution is filtered, reduced to approximately one-fourth its original volume, diluted with additional methanol and chilled. The recrystallized dihydrochloride salt is filtered, dried in a vacuum oven at 100° C. and melts with decomposition at 274–275° C. (lower if the rate of heating the capillary tube is slower), $\lambda_{max.}^{H_2O}$ 272, and $E_{1 cm.}^{1\%}$ 863.

EXAMPLE II 2,6-Bis(2-diethylaminoethoxy)-9,10-dibutylidene-9,10-dihydroanthracene dihydrochloride A solution of 64.8 (0.7 mole) of n-butyl chloride in 300 ml. of anhydrous tetrahydrofuran is added over a period of 1 to 2 hours under a nitrogen atmosphere to a stirred suspension of 13.9 g. (2.0 g. atoms) of finely cut lithium wire suspended in 300 ml. of anhydrous tetrahydrofuran. The reaction mixture is maintained at −25±5° C. during the addition and for an additional 2 hours thereafter by means of a Dry Ice-acetone bath.

To the stirred organolithium reagent solution is added 8.5 g. (0.019 mole) of 2,6-bis(2-diethylaminoethoxy)anthraquinone over a 30 minute period. After stirring for an additional one hour at −25±5° C., the reaction mixture is allowed to warm to 29° C. and is maintained overnight at ambient temperatures. The reaction mixture is cautiously treated with water, ether added, and the organic layer separated. The aqueous layer is extracted with additional ether and the combined ether extracts are washed with water, dried over anhydrous sodium sulfate, filtered and the volatiles removed under vacuum. The residue is dissolved in pentane, filtered and the solvent removed from the filtrate under vacuum. The residue is dissolved in anhydrous ether and treated with excess ethereal hydrochloric acid. The residual gum is separated, triturated with anhydrous ether and dissolved in approximately 150 ml. of methanol. The solution is boiled with repeated addition of dry acetone, which has been stored over molecular sieves, until a precipitate forms. After cooling to −20° C., the precipitate is filtered and recrystallized from a methanol-anhydrous ether mixture to give 2,6-bis(2-diethylaminoethoxy) - 9,10 - dibutylidene-9,10-dihydroanthracene as the dihydrochloride salt, m.p. sinters 218°, melts 234–5° C.

Following essentially the same procedure but substituting 2,7-bis(2-diethylaminoethoxy)anthraquinone,
2,6-bis(2-dimethylaminoethoxy)anthraquinone,
2,6-bis(2-piperidinoethoxy)anthraquinone,
2,6-bis(3-morpholinopropoxy)anthraquinone,
2,7-bis(3-dimethylaminopropoxy)anthraquinone, and
2,7-bis(2-diisopropylaminoethoxy)anthraquinone for the 2,6-bis(2 - diethylaminoethoxy)anthraquinone above results in the formation of the following 9,10-dialkylidene-9,10-dihydroanthracene ethers as their dihydrochloride salts, respectively:

2,7-bis(2-diethylaminoethoxy)-9,10-dibutylidene-9,10-dihydroanthracene,
2,6-bis(2-dimethylaminoethoxy)-9,10-dibutylidene-9,10-dihydroanthracene,
2,6-bis(2-piperidinoethoxy)-9,10-dibutylidene-9,10-dihydroanthracene,
2,6-(3-morpholinopropoxy)-9,10-dibutylidene-9,10-dihydroanthracene,
2,7-bis(3-dimethylaminopropoxy)-9,10-dibutylidene-9,10-dihydroanthracene, and
2,7-bis(2-diisopropylaminoethoxy)-9,10-dibutylidene-9,10-dihydroanthracene.

EXAMPLE III 2,6-Bis(2-diethylaminoethoxy)-9,10-diethylidene-9,10-dihydroanthracene dihydrochloride A solution of ethyl magnesium bromide in ether is prepared in the usual manner from 30.8 g. (0.28 mole) of ethyl bromide and 6.8 g. (0.28 g. atom) of magnesium turnings using a total of 150 ml. of anhydrous ether. The solution is decanted through glass wool, a portion of the solvent is boiled off until the temperature of the mixture reaches approximately 50° C. and 200 ml. of dry tetrahydrofuran is added causing a precipitate to form. To this Gregnard reagent mixture is added with stirring a solution of 10.0 (0.023 mole) of 2,6-bis(2-diethylaminoethoxy)anthraquinone dissolved in 215 ml. of warm anhydrous tetrahydrofuran. After stirring at room temperature for 1½ hours, the reaction mixture is refluxed for an additional 4 hours. The reaction mixture is decomposed in water and the product, 2,6-bis(2-diethylaminoethoxy)-9,10-diethylidene-9,10-dihydroanthracene isolated in a manner similar to that previously described. The product is converted to its hydrochloride salt and recrystallized from a solution of methanol-anhydrous ether.

Following essentially the same procedure, but replacing the above starting material, 2,6-bis(2-diethylaminoethoxy) anthraquinone, with an appropriate equimolecular amount of the following substituted anthraquinone ethers: 2,6-bis(2-dimethylaminoethoxy)anthraquinone, 2,6 - bis-(3 - morpholinopropoxy)anthraquinone, 2,7-bis(2-piperidinoethoxy)anthraquinone and 2,7 - bis(2-diethylaminoethoxy)anthraquinone, results in the formation of the following 9,10-dialkylidene-9,10-dihydroanthracene ethers as their hydrochloride salts, respectively: 2,6-bis(2-dimethylaminoethoxy)-9,10-diethylidene - 9,10 - dihydroanthracene, 2,6 - bis(3-morpholinopropoxy)-9,10-diethylidene-9,10-dihydroanthracene, 2,7 - bis(2 - piperidinoethoxy)-9,10 - diethylidene-9,10-dihydroanthracene and 2,7-bis(2-diethylaminoethoxy)-9,10-diethylidene - 9,10 - dihydroanthracene.

EXAMPLE IV

The following Example is illustrative of the anti-viral activity for the compounds of the present invention.

Thirty mice each weighing approximately 12 to 15 gms. are divided into two groups, a control group containing 20 animals and a test group of 10 animals. All of the animals are challenged with a fatal dose ($5LD_{50}$) of encephalomyocarditis virus. The test group of animals are treated both prophylactically and therapeutically using a parenteral composition containing 2,6-bis(2-diethylaminoethoxy) - 9,10 - dibutylidene - 9,10 - dihydroanthracene dihydrochloride as the active ingredient dissolved in an aqueous solution of 0.15% hydroxyethylcellulose. The composition contains the active ingredient in an amount such that each dosage contains 0.25 ml. which is equivalent to a dose level of 50 mg. per kg. The control group receives a subcutaneous placebo containing the same volume of vehicle without, of course, the active ingredient. Observations over a ten day period show a termination of all the control animals within a period of from 4 to 5 days, with the treated group of animals surviving for a statistically longer period of time.

EXAMPLE V

Preparation of a capsule formulation

An illustrative composition for hard gelatin capsules is prepared as follows:

| | Per Capsule, mg. |
|---|---|
| (a) 2,6-bis(2-diethylaminoethoxy) - 9,10 - dibutylidene-9,10-dihydroanthracene dihydrochloride | 200 |
| (b) Talc | 35 |

The formulation is prepared by passing the dry powders of (a) and (b) through a fine mesh screen and mixing them well. The powder is then filled into No. 0 hard gelatin capsules at a net fill of 235 mg. per capsule.

In a similar fashion, a soft gelatin capsule is prepared in which the talc is omitted. The dry 2,6-bis(2-diethylaminoethoxy)-9,10-dibutylidene - 9,10 - dihydroanthracene dihydrochloride powder can be filled either as a granulation, slug or compresesd tablet directly into the rotary die or plate mold in which the soft gelatin capsule is formed.

EXAMPLE VI

Preparation of a tablet formulation

An illustrative composition for tablets is as follows:

| | Per Tablet, mg. |
|---|---|
| (a) 2,7-bis(2-dimethylaminoethoxy) - 9,10 - dibutylidene-9,10-dihydroanthracene dihydrochloride | 100 |
| (b) Wheat starch and granulated starch paste | 15 |
| (c) Lactose | 33.5 |
| (d) Magnesium stearate | 1.5 |

The granulation obtained upon mixing lactose with the starch and granulated starch paste is dried, screened and mixed with the active ingredient and magnesium stearate. The mixture is compressed into tablets each weighing 150 mg.

EXAMPLE VII

Preparation of an oral syrup formulation

A 2% weight per volume syrup of 2,6-bis(2-piperidinoethoxy)-9,10-dibutylidene - 9,10-dihydroanthracene dihydrochloride is prepared by the usual pharmaceutical techniques in accordance with the following formula:

| | Grams |
|---|---|
| (a) Finely divided 2,6-bis(2-piperidinoethoxy)-9,10-dibutylidene-9,10-dihydroanthracene dihydrochloride | 2.0 |
| (b) Sucrose | 33.3 |
| (c) Chloroform | 0.25 |
| (d) Sodium benzoate | 0.4 |
| (e) Methyl p-hydroxybenzoate | 0.02 |
| (f) Vanillin | 0.04 |
| (g) Glycerol | 1.5 |
| (h) Purified water to 100.0 ml. | |

EXAMPLE VIII

Preparation of a parenteral formulation

An illustrative composition useful as a parenteral injection is the following emulsion:

| Each ml. contains | Ingredients | Amount |
|---|---|---|
| 50 mg | 2,6,bis(2-diethylaminoethoxy)-9,10-dibutylidene-9,10-dihydroanthracene. | 1.000 g. |
| 100 mg | Polyoxyethylene sorbitan monooleate | 2.000 g. |
| 0.0064 mg | Sodium choroide | 0.128 g. |
| | Water for injection, q.s | 20.000 ml. |

The parenteral composition is prepared by dissolving 0.64 g. of sodium chloride in 100 ml. of water suitable for injection. The polyoxyethylene sorbitan monooleate is mixed with the active ingredient, and an amount of the previously prepared aqueous sodium chloride solution is added which is sufficient to bring the total volume to 20 ml. The resulting solution is shaken and autoclaved for 20 minutes at 110° C. at 15 p.s.i.g. steam pressure. The composition can be dispensed in single ampule for use in multiple dosages or it can be dispensed in 10 or 20 individual ampules for use as a single dosage unit.

I claim:

1. A bis-basic ether of 9,10-dialkylidene-9,10-dihydroanthracene having the general formula:

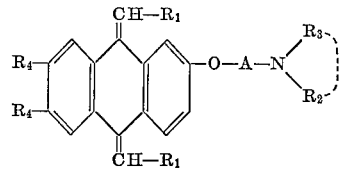

wherein $R_1$ is selected from the group consisting of hydrogen and a lower alkyl group having from 1 to 6 carbon atoms; A is ethylene or propylene; $R_2$ and $R_3$ are each lower alkyl having from 1 to 3 carbon atoms and which when taken together with the nitrogen atom to which they are attached represent the pyrrolidinyl, piperidino or morpholino radical; $R_4$ is selected from the group consisting of hydrogen and the radical

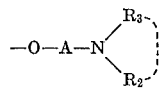

with the proviso that one and only one such $R_4$ group is hydrogen; and the pharmaceutically acceptable acid addition salts thereof.

2. A compound of claim 1 wherein each $R_2$ and $R_3$ is a lower alkly group having from 1 to 3 carbon atoms.

3. A compound according to claim 1 having the formula:

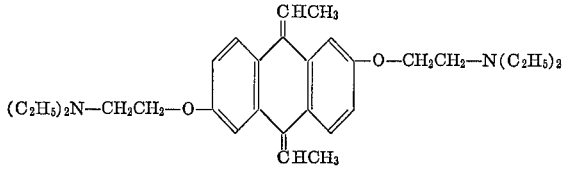

4. A compound according to claim 1 having the formula:

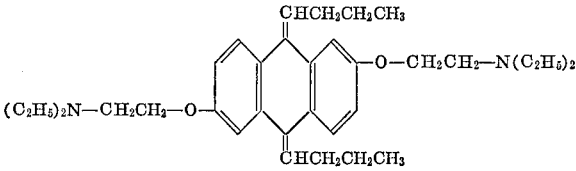

References Cited

FOREIGN PATENTS 1,422,878  11/1965  France _____ 260—351

OTHER REFERENCES

Brewster et al.: *Organic Chemistry*, 3rd Ed., pp. 762–765 (1964).

LORRAINE A. WEINBERGER, Primary Examiner

E. J. SKELLY, Assistant Examiner

U.S. Cl. X.R.

260—246 B, 272, 326.5 C; 424—248, 267, 274, 330

UNITED STATES PATENT OFFICE
CERTIFICATE OF CORRECTION

PATENT NO. : 3,838,177
DATED : September 24, 1974
INVENTOR(S) : Arthur D. Sill

It is certified that error appears in the above-identified patent and that said Letters Patent are hereby corrected as shown below:

Column 2, line 29, "alkylidene, derivatives" should read --alkylidene derivatives--.

Column 4, line 45, "dihydroanthracene" should read --dipropylideneanthracene--.

Column 8, line 2, "of" should read --or--.

Column 8, line 15, "against" should read --again--.

Signed and sealed this 10th day of June 1975.

(SEAL)
Attest:

RUTH C. MASON
Attesting Officer

C. MARSHALL DANN
Commissioner of Patents
and Trademarks